United States Patent [19]

Tokutomi

[11] 3,913,111

[45] Oct. 14, 1975

[54] CAMERA HAVING AUTOMATIC FLASH AND SHUTTER CONTROLS

[75] Inventor: Seijiro Tokutomi, Fujisawa, Japan

[73] Assignee: Asahi Kogaku Kogyo Kabushiki Kaisha, Japan

[22] Filed: Mar. 29, 1974

[21] Appl. No.: 456,378

[30] Foreign Application Priority Data

Apr. 3, 1973 Japan ................................ 48-38011

[52] U.S. Cl. ................................ 354/127; 354/139

[51] Int. Cl.² ................................ G03B 15/02

[58] Field of Search ........... 354/126, 127, 139, 149; 315/151

[56] References Cited

UNITED STATES PATENTS

| | | | |
|---|---|---|---|
| 3,648,104 | 3/1972 | Ackermann | 354/127 X |
| 3,681,649 | 8/1972 | Uno | 315/151 |

*Primary Examiner*—John M. Horan
*Attorney, Agent, or Firm*—Steinberg & Blake

[57] ABSTRACT

A camera which has automatic flash and shutter controls. The flash structure of the camera provides a preparatory flash illumination prior to film exposure and then, in accordance with information received during the preparatory flash illumination, a main flash illumination coinciding with film exposure. The camera also has an electronic shutter-control circuit for controlling the operation of the camera shutter in accordance with normal light different from the flash illumination. This shutter-control circuit includes a memory capacitor or the like for storing an electrical quantity corresponding to the normal light which is different from the flash illumination, and this memory capacitor is controlled by a memory switch. In accordance with the invention controls are provided for the preparatory flash and the memory switch in such a way that the time interval during which the memory switch renders the memory capacitor operative is different from a time interval during which the flash structure provides preparatory flash illumination, so that the electrical quantity stored by the memory capacitor remains uninfluenced by the preparatory flash illumination.

9 Claims, 5 Drawing Figures

CAMERA HAVING AUTOMATIC FLASH AND SHUTTER CONTROLS

BACKGROUND OF THE INVENTION

The present invention relates to cameras.

In particular, the present invention relates to cameras which are capable of being automatically controlled, and especially to cameras of this type which are capable of having automatic flash controls as well as automatic controls derived from normal light other than flash illumination.

The present invention relates particularly to a camera of this type where the flash controls provide first a preparatory flash illumination, prior to film exposure, and then during film exposure a main flash illumination which is controlled with information derived from the preparatory flash illumination.

As is well known, flash or speedlight devices are used under conditions where the object to be photographed receives so little normal available light that the exposure time determined in accordance with control of the shutter by an automatic shutter-control system would be much longer than the exposure time provided by way of flash illumination. The normal controls for regulating the exposure time with normal light other than flash illumination include a means such as a capacitor for memorizing an electrical quantity corresponding to the illumination of the object to be photographed, this capacitor or the like being controlled by a memory switch. If the latter renders the memory capacitor operative during the time when preparatory flash illumination takes place, then the electrical quantity stored by the memory device will be determined not only in accordance with the normal light at the object to be photographed but also in accordance with the preparatory flash illumination. Thus the automatic exposure-time determining circuitry will calculate for the shutter an exposure time corresponding to brightness at the object determined both by the normal light and the preparatory flash illumination, with the result that the automatically determined exposure time is shorter than the time required for proper illumination of the object by the main flash illumination itself. The result is that during exposure of the film the main flash illumination is not synchronized with the opening of the shutter since the latter closes under these conditions prior to termination of the main flash illumination, and accurate exposures cannot be achieved.

SUMMARY OF THE INVENTION

It is accordingly a primary object of the present invention to provide a structure which will avoid the above drawbacks.

In particular it is an object of the present invention to provide a structure according to which the memory device for storing an electrical quantity corresponding to normal illumination will not be influenced by the preparatory flash illumination.

Thus, it is an object of the present invention to provide circuitry according to which preparatory flash illumination is provided either prior to operation of the memory device or subsequent to operation thereof, with both of these operations requiring a time interval longer than that required by the preparatory flash illumination alone.

In particular, it is an object of the present invention to provide a camera which can accomplish the above objects while receiving both the normal illumination and the preparatory flash illumination after the light thereof has passed through the objective of the camera so that measurement of normal and preparatory flash illumination is carried out internally of the camera.

Thus, it is an object of the present invention to provide a structure of the above type for a single lens reflex camera of the type which measures light only after it has travelled through the camera objective.

In addition it is an object of the present invention to time the above operations in such a way, in a single lens reflex camera, that the normal light measurement and preparatory light measurement are completed before a mirror of the camera has reached an exposure position where it does not intersect the optical axis of the objective, with the diaphragm also being stopped down to a proper exposure aperture prior to opening of the shutter.

In accordance with the invention the camera has a flash means for providing a preparatory flash illumination prior to film exposure and a subsequent main flash illumination during film exposure. A preparatory circuit means is operatively connected with the flash means to control the latter during the preparatory flash illumination and a main circuit means is electrically connected both with the preparatory circuit means and the flash means to control the latter during main flash illumination with information derived during the preparatory flash illumination. A memory means is provided for storing an electrical quantity corresponding to normal illumination other than flash illumination, and a memory switch means is electrically connected with this memory means to render the latter operative to store this electrical quantity during a given time interval. A preparatory switch means is electrically connected with the preparatory circuit means for rendering the latter operative. A control means is operatively connected both with the preparatory switch means and the memory switch means for operating them at different, non-overlapping time intervals so that the memory means is not influenced by the preparatory flash illumination.

BRIEF DESCRIPTION OF DRAWINGS

The invention is illustrated by way of example in the accompanying drawings which form part of this application and in which.

DESCRIPTION OF PREFERRED EMBODIMENTS

Figure 2:
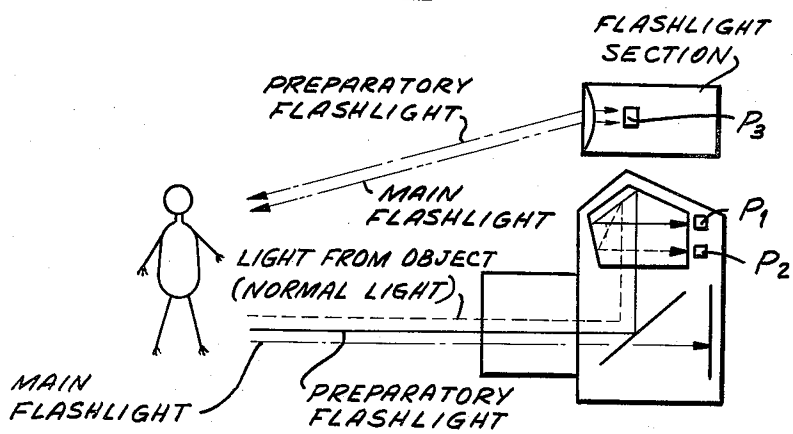
FIG. 2 is a diagrammatic representation of the operation of a camera of the invention.

Referring first to FIG. 2, it will be seen that the flashlight section indicated at the upper part of FIG. 2 forms a flash means for providing both preparatory flash illumination and main flash illumination as indicated by the pair of arrows directed toward the object which is to be photographed. Light is reflected from the object to be photographed to the objective of the schematically illustrated camera to travel through the objective so as to be reflected in the camera by the tiltable mirror which is schematically indicated therein, the reflected light being received at the viewfinder and being detected by a photosensitive means which includes the pair of photosensitive elements $P_1$ and $P_2$. The preparatory flash illumination is detected by a photosensitive means $P_3$ forming part of the flash means with the preparatory flash illumination also being detected by the photosensitive means $P_1$ in the camera. The normal illumination, other than flash illumination, is indicated by the dotted line travelling through the objective illustrated in FIG. 2 with this normal illumination being detected by the photosensitive element $P_2$. During main flash illumination the mirror is swung up from the light-receiving position illustrated in FIG. 2 to an exposure position so that the main flash illumination travels through the objective to reach the film plane in order to expose film in a well known manner while the shutter is open.

Figure 1:
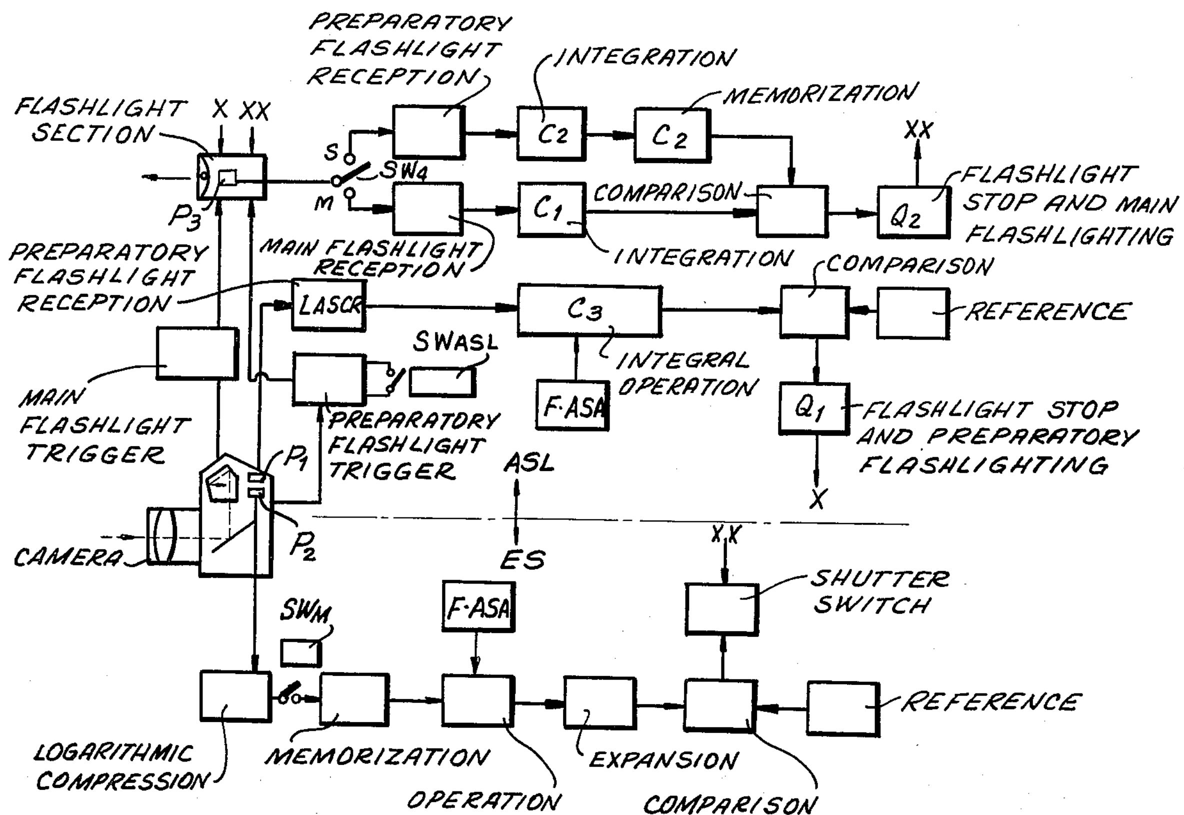
FIG. 1 illustrates the principle of the present invention in a block diagram.

In the block diagram of FIG. 1, the automatic speedlight structure is designated by the arrow ASL above the dot-dash line while the electronic shutter control structure is situated below the horizontal dot-dash line, designated by the arrow ES. With reference to the block diagram of FIG. 1, as is well known, when the shutter-tripping plunger of the camera is depressed, the memory switch $SW_M$ indicated at the lower left of FIG. 1 is opened while the mirror is still in its swung-down light-receiving position, and the electronic shutter control means ES will determine exposure times longer than the exposure time X which is required for flash illumination under conditions where the light at the object requires flash illumination for exposure. Under these latter conditions a preparatory switch means or autospeedlight switch $SW_{ASL}$ is closed to initiate the preparatory flash illumination. Thus the preparatory flashlight trigger block is operated to render the flashlight section shown at the upper left of FIG. 1 operative to provide the preparatory flash illumination which is detected by the photosensitive element $P_1$ after passing through the objective. This photosensitive element $P_1$ is electrically connected with the preparatory flashlight reception block in the form of an LASCR and is subjected to an integrating operation as indicated by the integral operation block which may include a capacitor $C_3$ as is apparent from the description below in connection with FIG. 3. In this way there is obtained a quantity or value equivalent to a light quantity which will provide optimum film exposure. After this information is provided at the comparison block with which the reference block cooperates as indicated in FIG. 1, a signal is transmitted to a flashlight stop and preparatory flashlighting block designated $Q_1$ which forms a quenching tube for terminating the operation of the flash means designated by the flashlight section at the upper left of FIG. 1, and it will be seen that the arrow X extending from the block $Q_1$ indicates a connection of this block with the flash means which also has an arrow X at the upper left part thereof. Thus, during this period of preparatory flash illumination the photosensitive element $P_3$ has directly detected the light quantity issued by the flash means. During the preparatory flash illumination a switch $SW_4$ connected to the photosensitive element $P_3$ is in the position S so that in accordance with the light detected by element $P_3$ there is also a preparatory flashlight reception and integration and memorization as indicated by the blocks designated $C_2$, which forms an integrating and memorizing capacitor for this part of the circuit, the detected quantity being transmitted to a comparison circuit, as designated by the comparison block at the upper part of FIG. 1.

Upon completion of the preparatory flash illumination the mirror swings up from its light-receiving position to its exposure position, and the time interval from the opening of the memory switch $SW_M$ to the starting of the upward swinging of the mirror is made long enough to enable the preparatory flash illumination to be received and integrated, this length of time being on the order of 3–5 msec.

Thus, the mirror swings up to the exposure position and the diaphragm is stopped down to the preset aperture, the leading curtain of the focal plane shutter has run down to open the shutter and start the exposure, and the X contact is closed for exposure with main flash illumination. While the main flash illumination travels through the objective to expose the film at this time, this main flash illumination is also detected by the photosensitive element $P_3$ with the switch $SW_4$ now being in the position M, so that the main flash illumination is received by the block designated main flashlight reception, with integration taking place by the succeeding block, designated by the capacitor $C_1$, and then a comparison is carried out to provide as a result of this comparison a flashlight stop and main flashlighting signal designated by the block $Q_2$, which forms a second quenching tube connected, as indicated by the arrows XX to the flash means indicated by the flashlight section at the upper left of FIG. 1, so as to terminate the operation thereof and thus terminate the film exposure with flash illumination.

During exposure with normal illumination, other than flash illumination, the photosensitive element $P_2$ forming part of the photosensitive means which receives the light after it has travelled through the objective is connected through the logarithmic compression block and the memory switch to the memorizing block and the subsequent operating block regulated in part in accordance with the aperture and film speed as indicated by the block FASA, and it will be noted that a similar block is connected to the integrating operation performed by the block $C_3$. In the shutter circuit ES the operation block is connected with a logarithmic expansion block, and after comparison as designated by the comparison block, with a suitable reference quantity, shown by the reference block at the lower right of FIG. 1, a signal is transmitted to the shutter switch in order terminate the exposure by closing the shutter. It will be noted that the arrow XX is connected also to this shutter switch so that the latter is operated simultaneously with terminating of the main flash illumination in accordance with the signal derived from the block $Q_2$.

Figure 3:
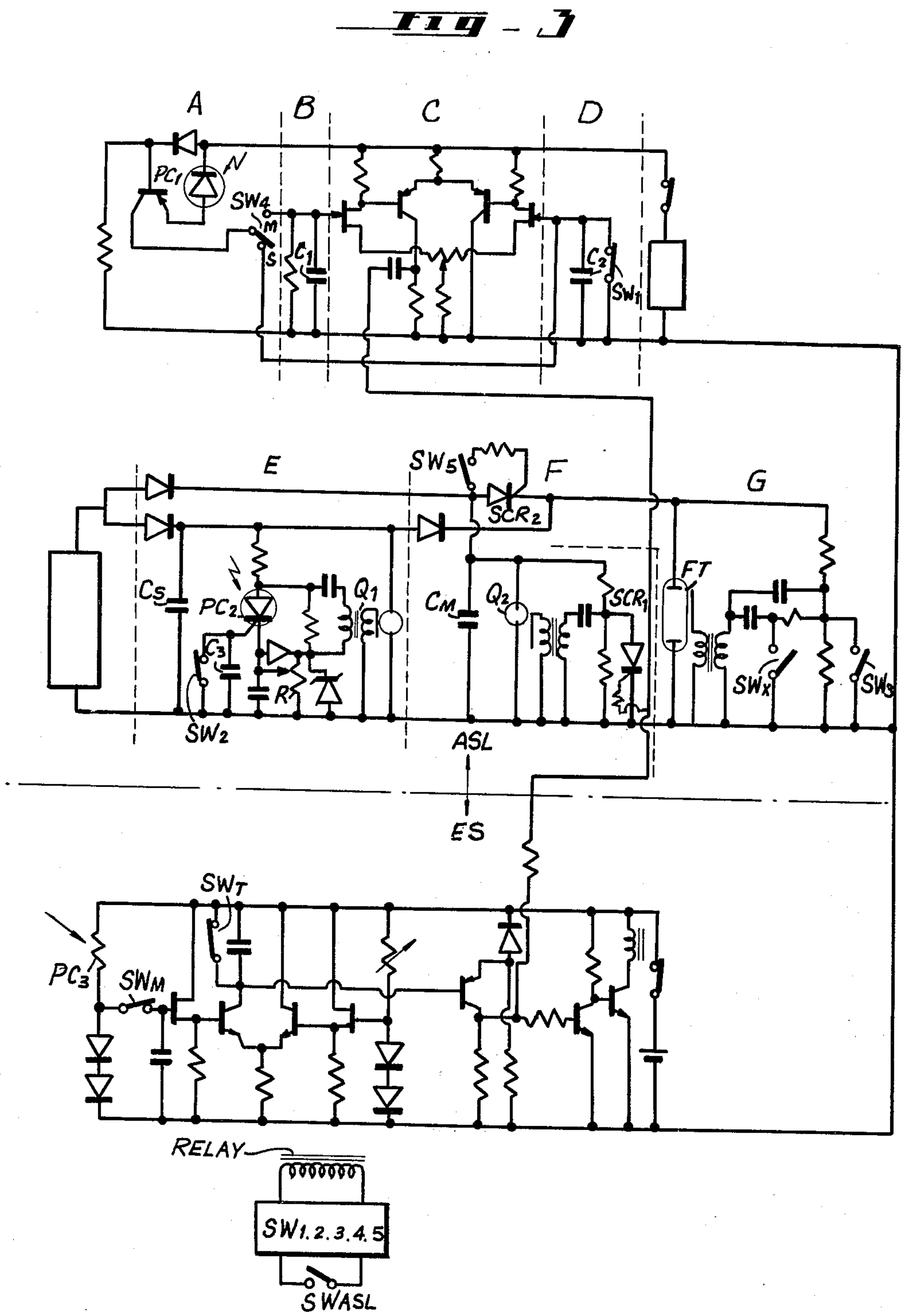
FIG. 3 illustrates one possible circuit in accordance with the invention.

A practical circuit arrangement operating as indicated above in FIG. 1 is illustrated in FIG. 3 where the part ASL above the dot-dash line indicates the autospeedlight section while the part ES below the dot-dash line represents the automatic electronic shutter-control section. Referring to the upper left part of FIG. 3, the flash illumination quantity measuring section A includes the flashlight quantity measuring element $PC_1$, corresponding to the element $P_3$ of FIGS. 1 and 2. This section A also includes the switch $SW_4$ having the positions S and M as indicated, for preparatory flash and main flash, respectively. The circuitry includes the main flash illumination integrating section B provided with the main flash quantity integrating capacitor $C_1$ which is also indicated in FIG. 1. The section C shown at the upper part of FIG. 3 corresponds to the comparison block shown at the upper right of FIG. 1 and forms a comparison operating section for comparing the main flash with the preparatory flash as will be apparent from the description below. The section D forms the preparatory flash illumination integrating section and includes the integrating and memorizing capacitor $C_2$ for integrating and memorizing the quantity of preparatory flash illumination, the corresponding blocks in FIG. 1 also being designated $C_2$. Connected in parallel across the capacitor $C_2$ is an integrating reset switch $SW_1$.

Below the above circuitry is a circuit portion including the section E forming the preparatory flash illumination stop section designated by the block $Q_1$ in FIG. 1. This section includes the light-sensitive control LASCR element $PC_2$ corresponding to the preparatory flashlight reception block of FIG. 1. Also at the section E is the capacitor $C_3$ for integrating the received preparatory flash illumination, and it will be noted that FIG. 1 also designates the integrating block at $C_3$. This section also includes the reset switch $SW_2$ connected in parallel across the capacitor $C_3$, as well as a variable resistor R for setting FASA, also designated by the block shown in FIG. 1 above the dot-dash line and forming part of the ASL section. In this section E there is also the preparatory flash stop or quenching tube $Q_1$ as well as a capacitor $C_S$ for storing the electrical charge required for preparatory flash illumination.

The section F forms the main flash illumination stop section including the quenching tube $Q_2$. A preparatory and main flash section G includes the single flash means formed by the flash tube FT, and this circuitry also includes the capacitor $C_M$ for storing the charge for main flash illumination. The capacitors $C_S$ and $C_M$ are connected to each other through a control element $SCR_2$ capable of switching between these capacitors, this part of the circuit including the trigger switch $SW_5$ for controlling element $SCR_2$. Shown at the central right part of FIG. 3 is the X contact designated by the switch $SW_X$ and the trigger switch $SW_3$.

The electronic shutter section ES includes the photosensitive light-receiving element $PC_3$, corresponding to element $P_2$ of FIGS. 1 and 2. This circuit also includes a known timing switch $SW_T$ which opens in synchronism with opening of the shutter as is well known. Shown at the lower part of FIG. 3 is the preparatory switch means $SW_{ASL}$ in the form of a relay switch operative to actuate the switches $SW_1$, $SW_2$, $SW_3$, $SW_4$, and $SW_5$. These switches are arranged with respect to the relay switch in such a way that the switches $SW_1$ and $SW_2$ are switched over from their closed to their open position, whereupon the switch $SW_3$ is switched from its closed to its open position, and then the switch $SW_4$ is displaced from the S contact to the M contact, and finally the switch $SW_5$ is switched from its closed to its open position. The timing of the operation of the switches $SW_3$, $SW_4$, and $SW_5$ are also controlled by suitably selecting the distance between the relay contacts so that they operate at a time interval longer than 3–5 msec. but not longer than 10 msec.

Figure 4:
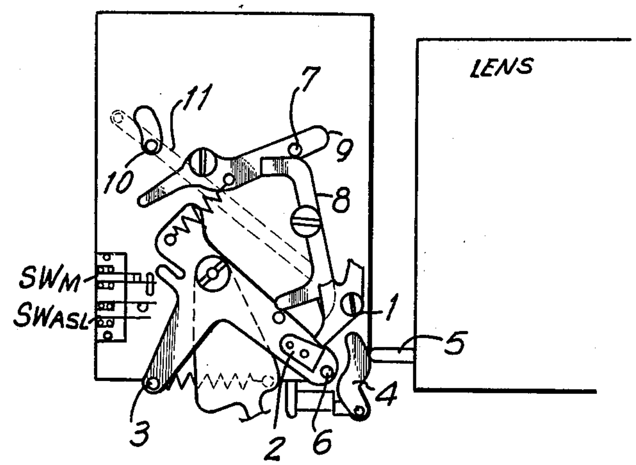
FIG. 4 illustrates one embodiment of a control means for controlling the sequence of operation of a pair of switch means.

After the power switch has been closed and the capacitors $C_M$ and $C_S$ have been charged, when the shutter button is depressed, a lever 1 indicated in FIG. 4 is turned in a known manner in a counterclockwise direction so that its lower end is displaced beyond a plate 2 carried by a mirror-actuating lever 3 so that upon disengagement of the plate 2 from the lever 1 the lever 3 is free to be swung in a counterclockwise direction by the spring illustrated at the bottom of FIG. 4. The result is that the upper left portion of the lever 3, as viewed in FIG. 4, opens the normally closed switch $SW_M$, so that during the first part of the swinging of the lever 3 at this early stage of the operation the memory switch $SW_M$ is switched from its closed to its open position, and the memorizing of the normal brightness, other than flash illumination, at the object to be photographed is completed. As is shown at the lower left of FIG. 3, the memory switch $SW_M$ is connected between the photosensitive element $PC_3$ and the memory capacitor. Therefore, once this switch $SW_M$ is opened, the quantity stored by the memory capacitor will no longer be influenced or changed.

The lever 3 continues to turn and, as is apparent from the lower part of FIG. 4, the portion of the lever 3 which initially opened the switch $SW_M$ now acts to close the switch $SW_{ASL}$, so that the relay indicated at the lower part of FIG. 3 operates the series of switches $SW_1$–$SW_5$ in the sequence referred to above. More specifically, the switches $SW_1$ and $SW_2$ are opened so that integration by the capacitors $C_2$ and $C_3$ takes place. At the same time the switch $SW_3$ is closed and preparatory flash illumination is started, utilizing the electrical charge stored in the capacitor $C_S$ in order to provide the required energy for the flash means FT.

Thus, it will be seen that the upper left portion of the lever 3, shown in FIG. 4, forms a control means cooperating with the memory switch means $SW_M$ and the preparatory switch means $SW_{ASL}$ to operate them in a sequence according to which the memory switch means is first operated to complete the operation of the memory means and only then is the preparatory switch means operated to bring about the preparatory flash illumination so that the quantity stored upon opening of the memory switch means will not be influenced by the preparatory flash illumination.

The preparatory flash illumination reflected from the object is received by the LASCR forming the light sensitive control element $PC_2$. This element converts the light which is received into a gate photoelectric quantity which is integrated by the capacitor $C_3$. At the time when the integrated voltage reaches a predetermined level, the control element LASCR turns on so as to trigger the preparatory flash quenching tube $Q_1$, and in a well known manner the remaining charge in the capacitor $C_S$ is bypassed through the quenching tube $Q_1$ so as to discharge therethrough and thus terminate the preparatory flash illumination by terminating the operation of the flash means FT, so that the flash illumination received by the photosensitive means $PC_1$, located immediately behind the flash tube FT is integrated and memorized by the capacitor $C_2$. This latter information corresponds to the required quantity of flash illumination to achieve a proper exposure.

Then, within 10 msec. the switches $SW_4$ and $SW_5$ operate to initiate the main flash illumination. On the other hand, at the time when the preparatory flash switch $SW_{ASL}$ operates, the mirror 11 and the diaphragm setting pin 5 have not yet been operated. As may be seen from FIG. 4, the mirror 11 is operated when the lever 9 of the lever means swings in a clockwise direction to engage the pin 10 and swing the mirror 11 up from its light-receiving position to its exposure position. This swinging of the lever 9 to bring about the upward swinging of the mirror does not take place until the upper end of the lever 8 moves beyond the pin 7 which is carried by the lever 9. The lever 3 carries a pin which acts on an arm of the lever 8 so as to swing the latter in a clockwise direction during counterclockwise swinging of the lever 3. Thus it is only after the upper left end of the lever 8 moves beyond the pin 7 that the lever 9 is swung by the illustrated spring to displace the mirror 11 up to its exposure position. It is only at this time when the mirror 11 is about to swing up that a pin 6 carried by the lever 3 engages a lever 4 to swing the latter in a clockwise direction for displacing the pin 5 by pushing on the latter and thus stopping the diaphragm down to the proper aperture in a well known manner. The time interval from closing of the preparatory switch means $SW_{ASL}$ to upward swinging of the mirror 11 and pushing of the diaphragm pin 5 is set so as to be on the order of 3–5 msec.

Under the conditions where the mirror has been swung up to its exposure position and the stopping down of the diaphragm has been completed, the switches $SW_4$ and $SW_5$ are switched over with the former engaging the contact M while the latter closes, and at this time the leading curtain has placed the shutter in its fully open position and the X contact switch $SW_X$ has been automatically closed so as to bring about in this way operation of the flash means FT with the charge stored in the capacitor $C_M$. The flash illumination at this time is received and integrated again by the light-receiving and the measuring element $PC_1$, with the capacitor $C_1$ being operative at this time for carrying out the required integration. The integrated voltage derived in this way from the capacitor $C_1$ is compared at the circuit section C with the voltage previously stored in and memorized by the capacitor $C_2$ in accordance with the quantity of preparatory flash illumination. When the amount of main flash illumination reaches an optimum value a quench signal is applied to the control element $SCR_1$ so as to trigger the main flash stop or quenching tube $Q_2$, which operates to bypass the electrical charge remaining in the capacitor $C_M$ and thus terminate the operation of the flash means FT at the instant when optimum exposure with the main flash illumination has been achieved. This quench signal is also transmitted to the shutter control circuit ES and in particular to that part thereof shown at the right in FIG. 3 and forming the shutter-closing circuit so that this shutter-closing circuit means of the electronic shutter-control circuitry is now operated directly from the main flash circuit means in order to provide the signal for automatically closing the shutter by releasing the trailing curtain thereof. This quenching operation of the discharge tube takes place faster than mechanical operation of the shutter with the available normal light by the electronic circuitry which includes the memory means and memory switch $SW_M$, so that the exposure of the film with the flash illumination is not influenced by the normal light quantity stored by the memory capacitor of the electronic circuitry ES. Thus, this latter circuitry will first determine, depending upon the external light, an exposure time which is longer than the flash exposure time X required for proper flash exposure, and instead of being influenced by this latter factor with the circuitry of the invention the shutter is closed simultaneously with termination of the main flash illumination in perfect synchronism with the main flash illumination to achieve in this way an exposure without the extra external exposure which otherwise would result from the measurement of the normal light in addition to the preparatory flash illumination. In this way the film is exposed only with the optimum amount of flash exposure illumination.

With the structure of the invention as described above, the memorizing of an electrical quantity corresponding to normal illumination, other than flash illumination, is completed prior to the preparatory flash illumination. However it is also possible, as described below, for the invention to include a structure according to which the preparatory flash illumination is completed, upon depression of the shutter-tripping plunger, prior to operation of the memory switch $SW_M$ to bring about storing of an electrical quantity corresponding to the normal illumination, with this latter memory operation taking place after a time interval of approximately 3–5 msec., which is sufficiently long to complete the preparatory flash illumination prior to the time when the mirror is swung up to its exposure position and the diaphragm is stopped down.

Figure 5:
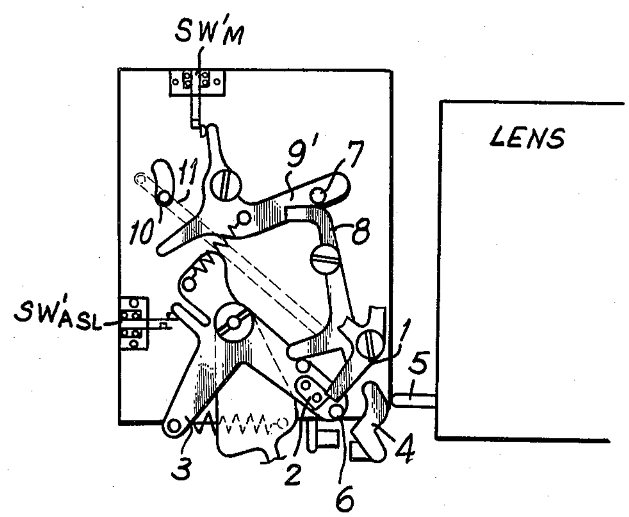
FIG. 5 is a diagrammatic representation of another embodiment of a control means for determining the sequence of operation of a pair of switch means.

With this type of operation, subsequent to operation of the mechanical structure, the electrical circuitry and the mirror-diaphragm combination, each of which operates in association with the preparatory switch means $SW_{ASL}$ and the memory switch means $SW_M$, the device of the invention operates in a manner similar to that described above. Thus, upon depression of the shutter button the lever 1 of FIG. 5 is swung in a counterclockwise direction to become disengaged from the holding plate 2 carried by the lever 3, so that the latter is again operated to initiate the operations which will result in swinging up of the mirror 11. During the initial part of the swinging of the lever 3, however, the control means formed by the upper left portion thereof, as viewed in FIG. 5, closes the switch $SW'_{ASL}$ so as to operate the relay described above in connection with FIG. 3 and thus cause the series of switches $SW_1$–$SW_5$ to operate in the manner described above to bring about the preparatory flash and other associated operations. At this time when the switch $SW'_{ASL}$ is closed the mirror 11 and diaphragm pin 5 have not yet been operated. It is only when the lever 8 moves beyond the pin 7 to become disengaged from the latter that the lever 9' of FIG. 5 turns in a clockwise direction to raise the mirror by engaging the pin 10. The pin 6 also acts on the lever 4 to push the pin 5 in order to stop the diaphragm down. The time interval which elapses from the instant when the preparatory switch means $SW'_{ASL}$ closes and ends when the mirror 11 and the diaphragm pin 5 start to operate is set so as to be 3–5 msec.

With the embodiment of FIG. 5, the mirror-operating lever means 3, 9' includes as the control means not only the upper left portion of the lever 3 but also the upper portion of the lever 9'. The memory switch $SW'_M$ of the embodiment of FIG. 5 is opened only when the lever 9' has started to turn upon disengagement of the lever 8 from pin 7, the opening of the switch $SW'_M$ taking place prior to the upward swinging of the mirror 11, in order to render the memory capacitor operative to store an electrical quantity corresponding to the normal light, other than flash illumination, and this opening of the memory switch $SW'_M$ takes place only after the preparatory flash illumination has been completed. Thus the operation of the memory switch means $SW'_M$ takes place during the time interval after the mirror-operating lever 9' starts to turn and before the mirror 11 has actually been swung up to its exposure position. The shape of the diaphragm controlling lever or plate 4 is such that the diaphragm pin 5 starts to be pushed in order to stop the diaphragm down after the mirror 11 has started to swing upwardly. In this way the memory switch $SW'_M$ will determine the exposure time depending only upon the normal light and the entire device will now operate in the same way as described above in connection with the first embodiment until main flash illumination is completed and the trailing curtain runs down to close the shutter.

It is possible to provide several alternate methods of bringing about operation of the memory switch means $SW'_M$ within the time interval after the shutter button is operated and before the mirror and diaphragm are operated or more specifically at a time interval after completion of the preparatory flash illumination. One possible method is such that the timing circuit is operated in association with the preparatory flash switch $SW'_{ASL}$ and the memory switch $SW'_M$ is operated by the relay with a time lag with respect to the flash operation. Another possible method is such that the memory switch $SW'_M$ is incorporated into the relay and arranged to be operated by the preparatory flash switch $SW'_{ASL}$ with the memory switch $SW'_M$ being operated with a time lag with respect to the preparatory flash illumination, this time lag being adjusted by suitably selecting the space between the relay contacts and the elasticity thereof. Still another possible method is one where the operating interval of the preparatory flash switch and the memory switch are obtained by means of a mechanical timing control, such as a suitable governor.

As is apparent from the above, in accordance with the invention the automatic exposure time determination for controlling the shutter automatically achieves a shutter speed which is properly synchronized with the automatic flash operation without requiring any additional mechanical structure, electrical circuitry, or switch means. This arrangement also contributes to the elimination of the danger of improperly synchronized photographic operations due to errors in setting the shutter dial and in the switching operations and enables optimum exposure photography to be achieved with a simple operation by utilizing flash illumination which can be switched automatically depending upon the brightness of the object which is to be photographed.

What is claimed is:

1. In a camera, flash means for providing preparatory flash illumination prior to film exposure and main flash illumination during film exposure, preparatory circuit means electrically connected with said flash means for operating the latter to provide said preparatory flash illumination, main circuit means electrically connected with said flash means and with said preparatory circuit means for operating said flash means to provide said main flash illumination in a manner determined by the operation of said flash means during said preparatory flash illumination, memory means for storing an electrical quantity corresponding to normal illumination, memory switch means electrically connected with said memory means for rendering the latter operative during one interval to store said electrical quantity, preparatory switch means electrically connected with said preparatory circuit means for rendering the latter operative during another interval, and control means operatively connected with said memory switch means and said preparatory switch means for making said intervals occur at different at least partly non-overlapping times by respectively operating both of the latter switch means at different at least partly non-overlapping times to thereby permit said memory means to store an electrical quantity corresponding to normal illumination and prevent said memory means from storing an electrical quantity corresponding to said preparatory flash illumination.

2. The combination of claim 1 and wherein said control means is operatively connected with said memory switch means for operating the latter prior to operation of said preparatory switch means.

3. The combination of claim 1 and wherein said control means is operatively connected with said preparatory switch means for operating the latter prior to operation of said memory switch means.

4. The combination of claim 1 and wherein an objective receives light from an object to be photographed, and photosensitive means for receiving both the preparatory flash illumination and the normal illumination after light of both of the latter illuminations has travelled through the objective.

5. The combination of claim 4 and wherein said photosensitive means includes a pair of photosensitive components one of which is operatively connected with said preparatory circuit means and the other of which is operatively connected with said memory means through said memory switch means.

6. The combination of claim 1 and wherein an electronic shutter-controlling means for automatically controlling exposure time includes said memory means and said memory switch means, said electronic shutter-controlling means including a shutter-closing circuit means for automatically closing the shutter in accordance with controls determined in part by the quantity stored by said memory means, and said main flash circuit means being electrically connected with said shutter-closing circuit means for operating the latter automatically upon termination of the main flash illumination independently of the remainder of said electronic shutter controlling means for synchronizing film exposure with said main flash illumination independently of the quantity stored by said memory means.

7. In a camera, flash means for providing preparatory flash illumination prior to film exposure and main flash illumination during film exposure, preparatory circuit means electrically connected with said flash means for operating the latter to provide said preparatory flash illumination, main circuit means electrically connected with said flash means and with said preparatory circuit means for operating said flash means to provide said main flash illumination in a manner determined by the operation of said flash means during said preparatory flash illumination, memory means for storing an electrical quantity corresponding to normal illumination different from flash illumination, memory switch means electrically connected with said memory means for rendering the latter operative to store said electrical quantity, preparatory switch means electrically connected with said preparatory circuit means for rendering the latter operative, and control means operatively connected with said memory switch means and said preparatory switch means for respectively operating both of the latter switch means at different times for providing a quantity stored by said memory means which will not be influenced by said preparatory flash illumination and wherein a mirror means is swingable between a light-receiving position and an exposure position, and lever means operatively connected with said mirror means for swinging the latter from said light-receiving position to said exposure position, said lever means having a portion forming said control means and operating said memory switch means and said preparatory switch means prior to swinging of said mirror means from said light-receiving position to said exposure position thereof.

8. The combination of claim 7 and wherein said portion of said lever means which forms said control means first opens said memory switch means to terminate the operation of said memory means and then closes said preparatory switch means for initiating the operation of said preparatory circuit means.

9. The combination of claim 7 and wherein said portion of said lever means which forms said control means first closes said preparatory switch means to operate said preparatory circuit means and then opens said memory switch means to render said memory means operative subsequent to the interval during which preparatory flash illumination is provided by said flash means.

* * * * *